Feb. 9, 1926. 1,572,801

P. C. KEARNEY

PISTON RING COMPRESSOR

Filed Feb. 5, 1925

INVENTOR
Paul Cecil Kearney
by his attorneys
Howson and Howson

Patented Feb. 9, 1926.

1,572,801

UNITED STATES PATENT OFFICE.

PAUL CECIL KEARNEY, OF BRIDGEPORT, CONNECTICUT.

PISTON-RING COMPRESSOR.

Application filed February 5, 1925. Serial No. 7,014.

*To all whom it may concern:*

Be it known that I, PAUL CECIL KEARNEY, a citizen of the United States of America, and a resident of Bridgeport, county of Fairfield, State of Connecticut, have invented certain new and useful Improvements in Piston-Ring Compressors, of which the following is a specification.

This invention relates to piston ring compressors. One object of the invention is to provide a simple tool which will permit the quick and easy insertion of a piston having rings into its cylinder and another object is to provide a tool which can be used for pistons of different sizes. The compressor is particularly useful in connection with putting new piston rings in automobile engines.

Figure 1:
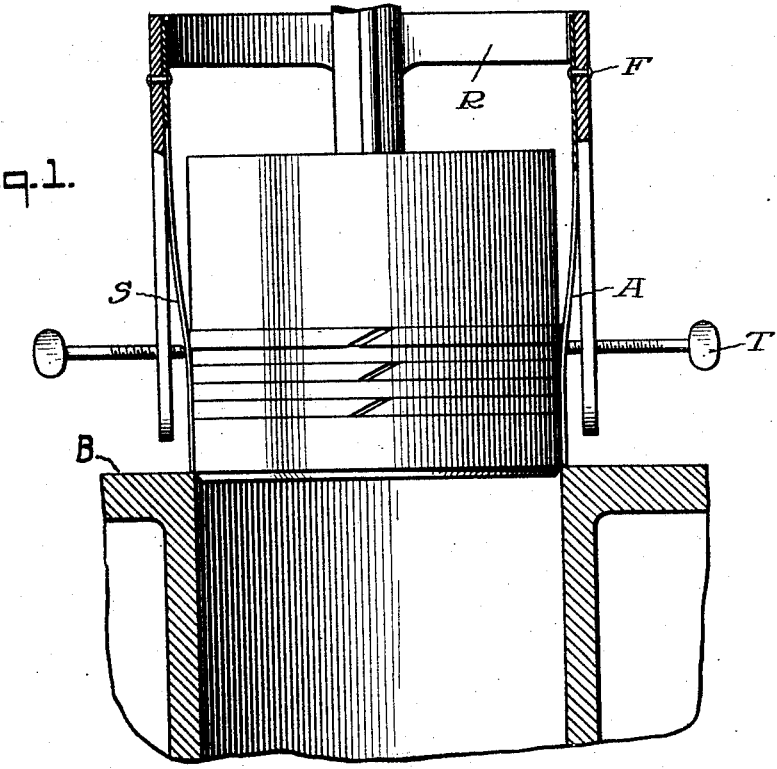
Figure 2:
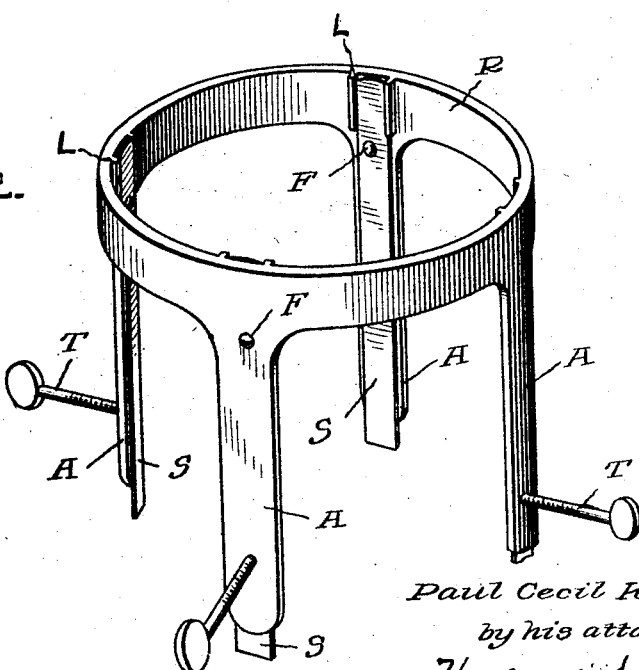

In the drawings Fig. 1 is a sectional elevation of the compressor on a cylinder block, showing a piston being inserted into a cylinder; while Fig. 2 is a perspective view of the compressor by itself.

In fitting new rings onto pistons of internal combustion engines one of the greatest difficulties has been to compress the rings sufficiently to slip the piston into the cylinder. Since the new rings generally have to be ground down before they fit properly, the piston is slipped into the cylinder several times for trial, before it is put in for the final time. The importance of a simple compressor which will act quickly and efficiently can therefore readily be seen.

The compressor forming the subject of the present invention has a frame made of brass, or other rigid material consisting of a ring R and a plurality of arms A, approximately equidistant from each other extending from one side of and at right angles to the diameter of the ring. (In the drawing I have shown four arms.) Fastened on the inner side of each arm A by a rivet F near the ring is a flat spring S.

These springs or spring fingers may be held from swinging sideways by means of lugs L formed on the frame and engaging the edges of the springs. I have found it preferable to extend the spring fingers approximately ¼ inch beyond the ends of the arms, although it will be understood that the spring fingers may be made of the same length as the arms or even slightly shorter than the arms.

Each arm is drilled and tapped near its free end and a thumbscrew T threaded therein. The point of each thumbscrew is adapted to bear against the spring finger lying along the inner side of the arm—preferably at a point about one inch from the free end of the spring finger—and press the latter inward. In this way the spring fingers will form the limits of a tapered opening through which a piston may be moved. The ring of the compressor is slightly larger than the largest piston which it is designed to accommodate.

When it is desired to put a piston on which the rings have been fitted, into its cylinder, the compressor is first brought to the proper size by turning the thumbscrews so as to press the four spring fingers inward till the gap formed by the free ends approximates the size of the cylinder or is slightly less. The compressor is then placed on the cylinder block B with the spring ends in register with the cylinder opening into which the piston is to be placed. The piston with its rings fitted on it is then inserted through the ring R of the compressor, and is slid down between the four springs S. As the piston is forced down the rings, which have been projecting beyond the walls of the piston, are successively and gradually compressed to the size of the piston by their sliding contact with the springs. When each ring reaches a point opposite the thumbscrews it is down to the size of the piston and exerting a maximum pressure against the spring fingers. As each ring passes beyond the thumbscrews it holds the free ends of the spring fingers in parallel position and thus obtains contact against the full width of its edge. The rings in this position slide down to and into the cylinder opening easily and the job is complete.

It will be understood that the use of this tool is not limited to employment when a ringed-piston is to be introduced into a cylinder from one end as shown in the drawing but the tool may also be utilized when a ringed piston is to be put in from the opposite end of the cylinder by turning the piston around, i. e. by introducing the open end of the piston first through the ring of the tool.

By operation of the thumb-screws the amount of the taper may be varied to any size cylinder for which the tool is likely to be needed.

What I claim is:

1. A piston ring compressor having a frame consisting of a rigid ring and a plurality of approximately equidistantly spaced arms extending in one direction therefrom at right angles to the diameter of said ring, with a spring finger rigidly fastened to one end of each of said arms and screw means adapted when turned to push inward against said spring fingers to form an adjustably tapered opening through which a ringed piston can be forced.

2. A piston ring compressor having a frame and spring fingers fastened in said frame in combination with thumbscrews adapted to force said spring fingers to form an adjustably tapered opening through whose small end a piston can be forced, said thumbscrews being at a small distance from the free ends of the spring fingers, as and or the purposes described.

In testimony whereof I have signed my name to this specification.

PAUL C. KEARNEY.